United States Patent [19]
Gaylord

[11] Patent Number: 4,614,333
[45] Date of Patent: Sep. 30, 1986

[54] DEVICES FOR AUTOMOTIVE VEHICLE COIL SPRINGS

[76] Inventor: James K. Gaylord, 3500 E. Lincoln Dr., Phoenix, Ariz. 85018

[21] Appl. No.: 766,250

[22] Filed: Aug. 16, 1985

Related U.S. Application Data

[63] Continuation-in-part of Ser. No. 505,930, Jun. 20, 1983, which is a continuation-in-part of Ser. No. 168,449, Jul. 10, 1980, abandoned.

[51] Int. Cl.[4] ................................. F16F 3/10
[52] U.S. Cl. ................... 267/61 S; 267/33; 267/152; 280/715
[58] Field of Search ............... 267/33, 615, 152; 280/715

[56] References Cited
U.S. PATENT DOCUMENTS

| | | | |
|---|---|---|---|
| 2,703,234 | 3/1955 | Tapp | 267/33 |
| 3,141,660 | 7/1964 | Clarke et al. | 267/615 X |
| 4,098,498 | 7/1978 | Da Silva | 267/615 |

FOREIGN PATENT DOCUMENTS

| | | | |
|---|---|---|---|
| 1253864 | 1/1961 | France | 267/33 |
| 207959 | 3/1984 | German Democratic Rep. | 267/615 |
| 2829 | of 1870 | United Kingdom | 267/33 |
| 946495 | 1/1964 | United Kingdom | 267/615 |

*Primary Examiner*—George E. A. Halvosa
*Attorney, Agent, or Firm*—Gary, Juettner & Pyle

[57] ABSTRACT

Devices for stiffening automotive vehicle coil springs comprise spacers positionable between one or more adjacent convolutions of the springs. The spacers offer no or very minimal resistance to limited compressions of the springs, but an increased resistance to increased compressions. They do not interfere with the standard manufactured height of the springs or vehicle, and under normal driving conditions the vehicle rides smoothly on its suspension. However, under severe conditions, causing sufficient compressions of the springs, the spacers stiffen the reaction of the springs for increased roadability, handling the safety.

16 Claims, 24 Drawing Figures

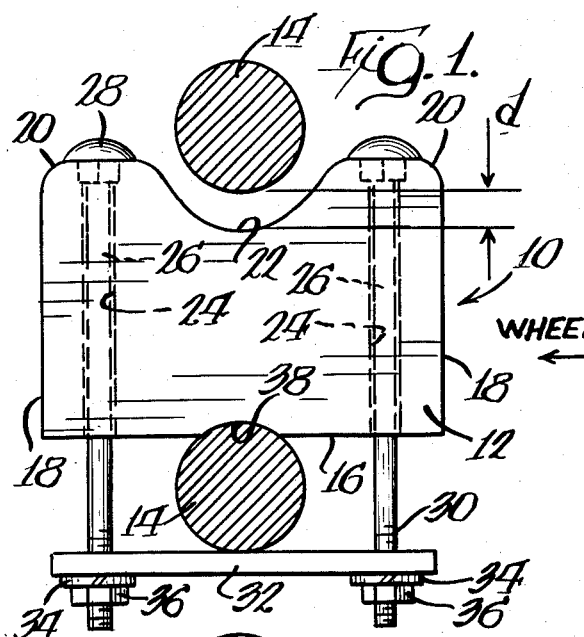
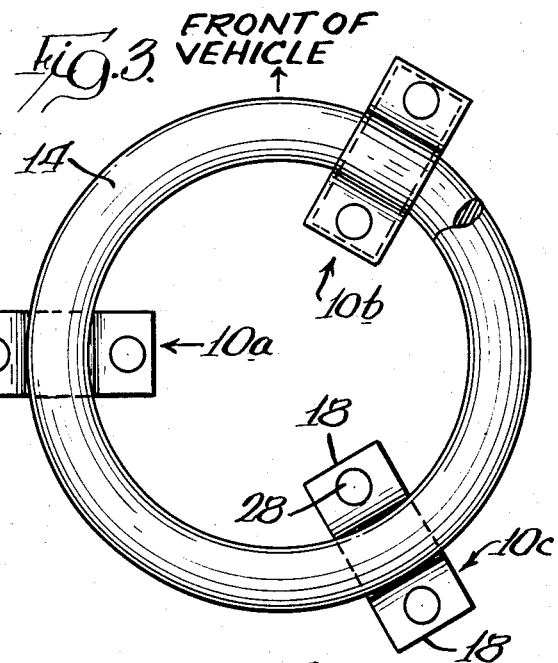
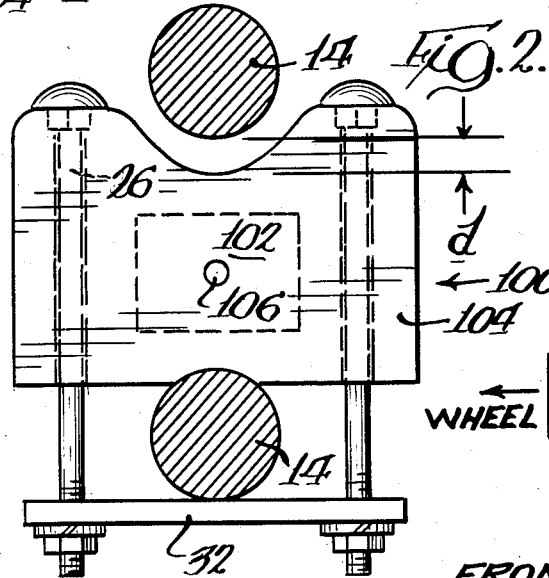
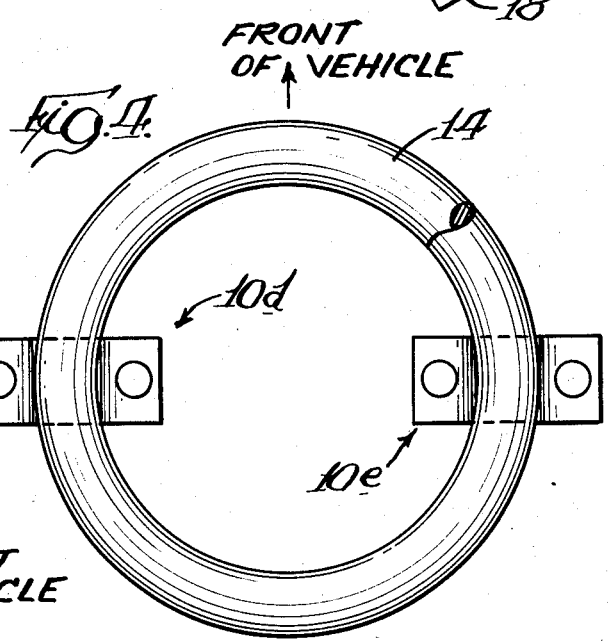
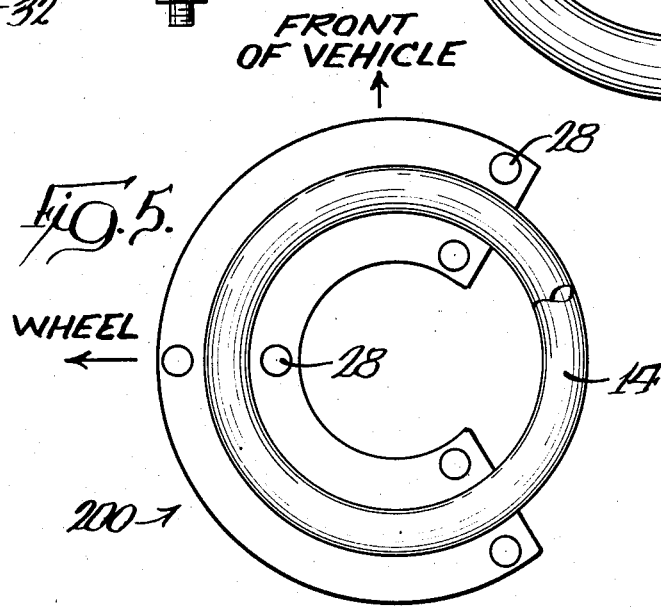

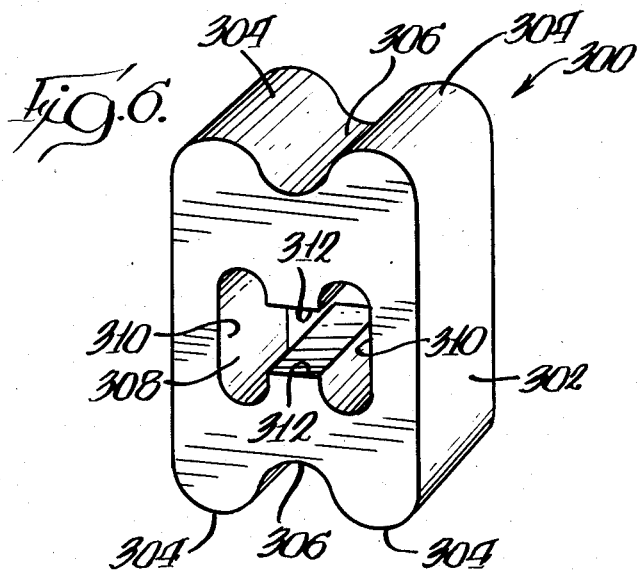
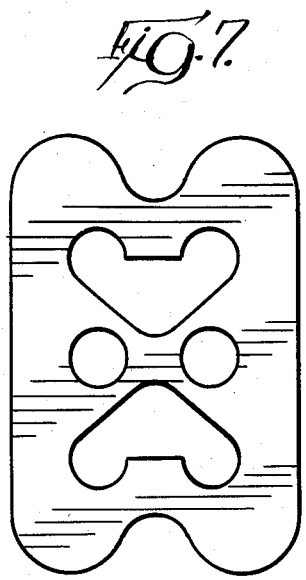
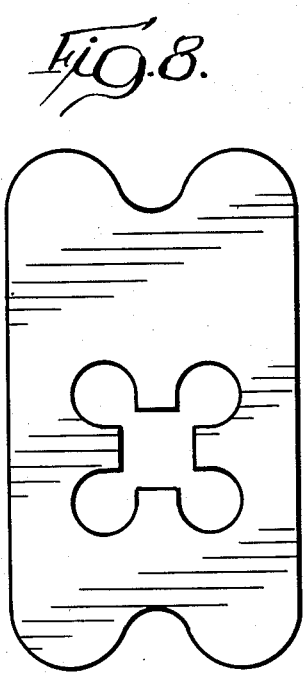
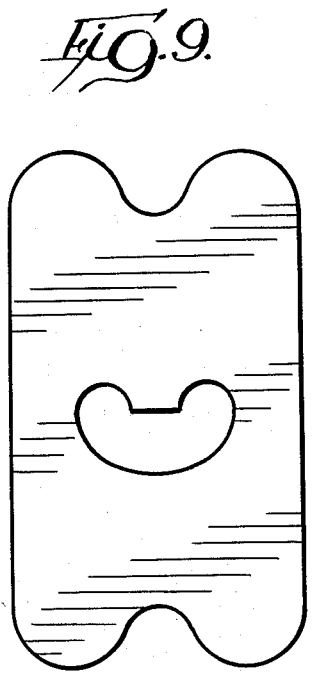

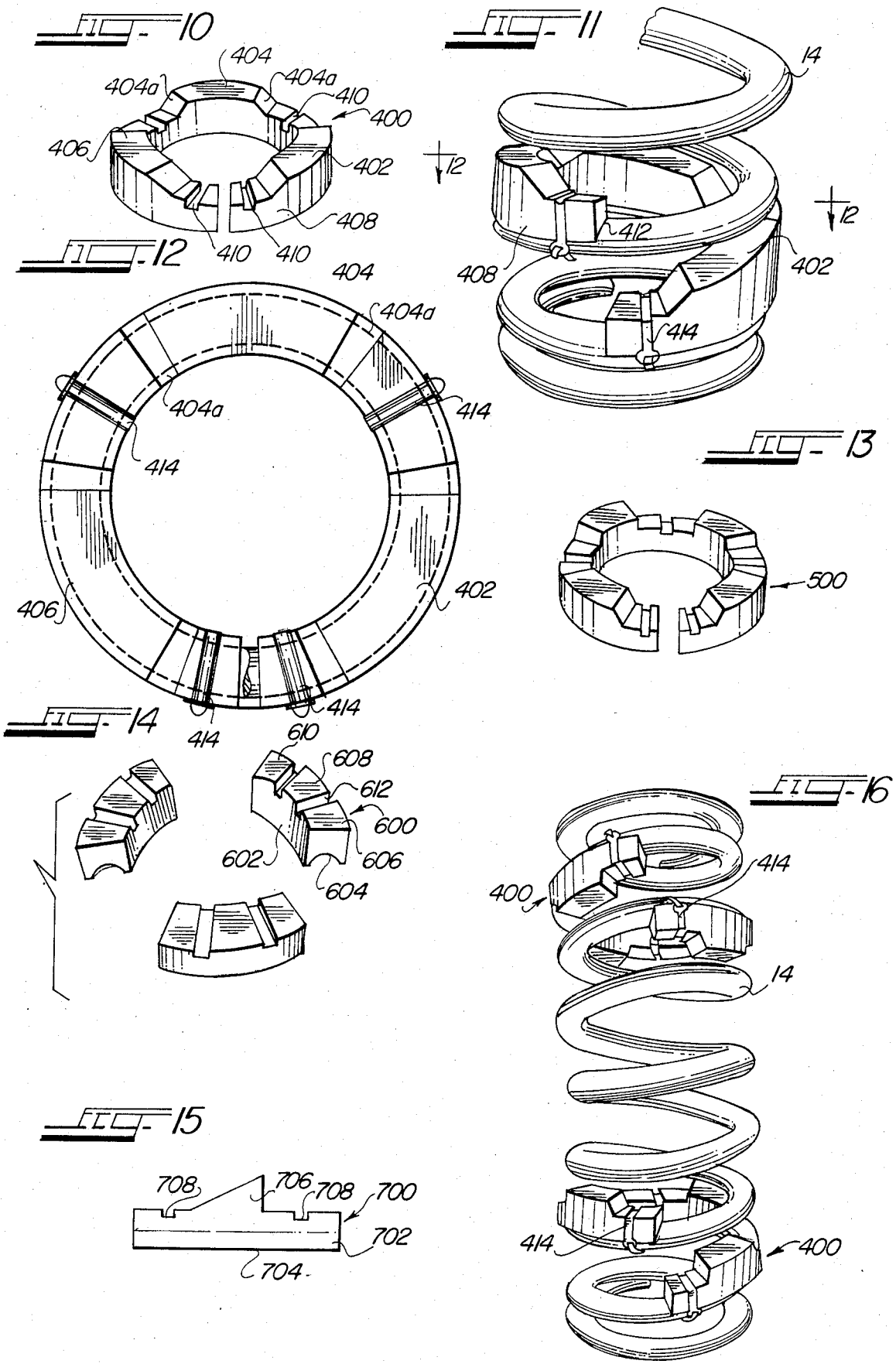

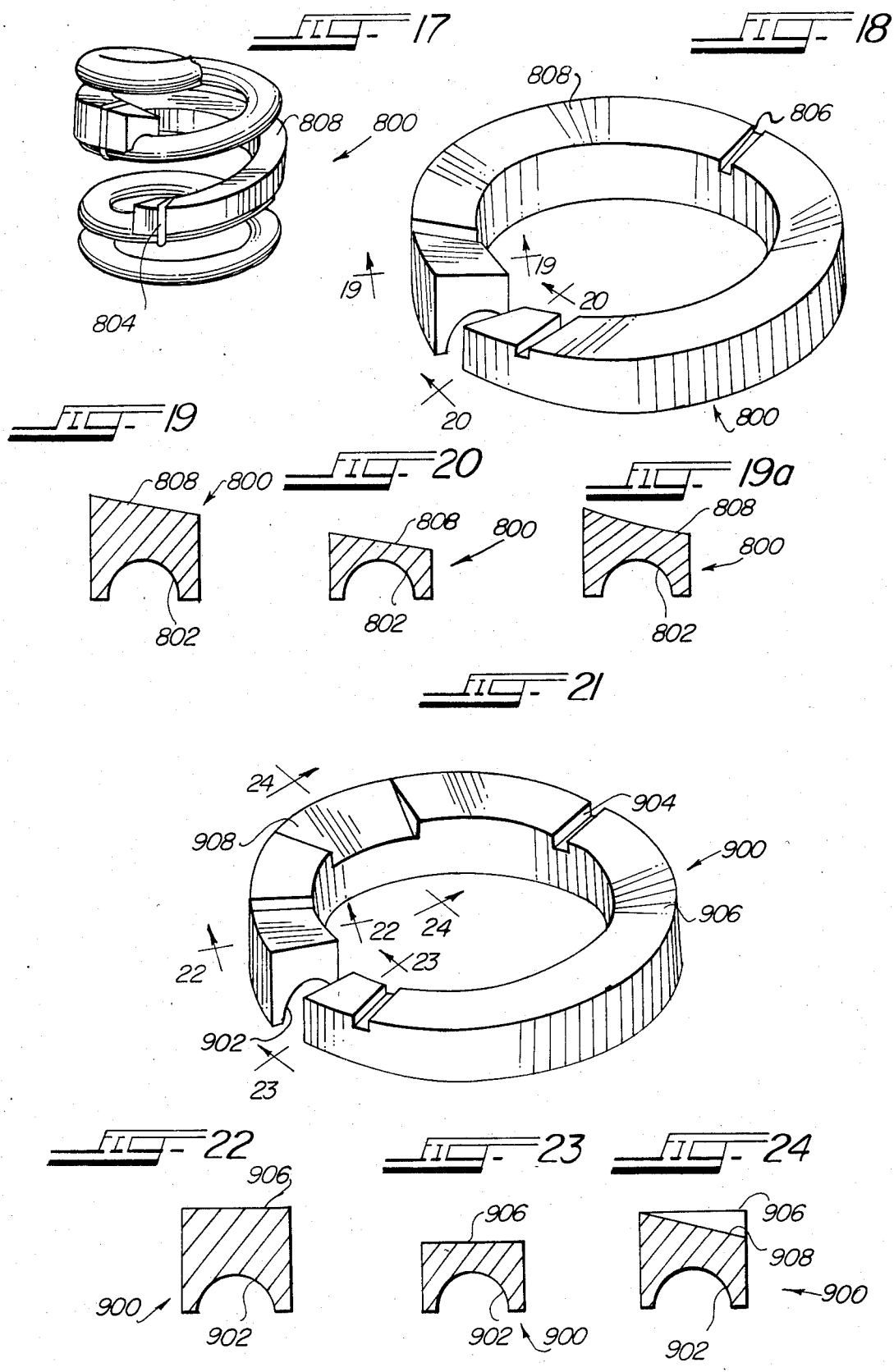

DEVICES FOR AUTOMOTIVE VEHICLE COIL SPRINGS

BACKGROUND OF THE INVENTION

This application is a continuation-in-part of application Ser. No. 505,930, filed June 20, 1983, which in turn is a continuation-in-part of application Ser. No. 168,449, filed July 10, 1980, now abandoned.

The present invention relates to automotive vehicle suspension systems, and in particular to improved suspension systems having resilient spacers between adjacent convolutions of coil springs, which enable the vehicle to ride smoothly in a designed manner on its suspension under normal driving conditions, but progressively stiffen the springs under severe driving conditions for enhanced handling.

Conventional automobiles have coil springs at the front two and possibly all four wheels for supporting the vehicle body and frame on the chassis. The springs isolate the body and frame from roadway shocks and undulations encountered by the wheels, so that occupants of the vehicle may ride in comfort, and shock absorbers dampen oscillations of the body on the springs. Ordinarily, the coil springs have a stiffness or compressibility which is a compromise between a smooth ride and good vehicle handling. Soft springs afford a cushioned ride and maximum passenger comfort on smooth or slightly undulating roadways. However, springs which are too soft do not offer sufficient resistance to acceleration squat or braking dive, or to collapse and possible bottoming under heavy vehicle loads or in response to pronounced roadway undulations or sharp turns at increased speeds, with the result that the vehicle body dips and leans excessively and vehicle handling, roadability and safety are compromised. Stiff springs, on the other hand, maintain the vehicle body and frame relatively steady and level for increased load carrying capability, roadability and handling under severe conditions, but do not satisfactorily isolate the body from roadway shocks and undulations, so that even on relatively smooth roads a rough ride may be experienced by passengers.

Unless a special suspension system is ordered and installed, automobiles most often are equipped with springs which compromise toward a soft ride. Consequently, their suspension systems are satisfactory under relatively smooth driving conditions as are usually encountered the majority of the time, but unsatisfactory and possibly dangerous under severe roadway or handling conditions or when the vehicle is heavily loaded.

Previous efforts to improve suspension systems of softly sprung automobiles have heretofore proven generally unsatisfactory. First, most modifications are expensive and difficult to implement and, secondly, they usually provide good roadability and handling only at the expense of passenger comfort. An obvious way to modify a vehicle's suspension system for improved handling and load carrying capability is to replace the original springs with heavy duty or relatively stiff springs. However, not only is spring replacement expensive, but stiff springs result in an uncomfortably hard ride under average driving conditions when the vehicle is less than heavily loaded. A somewhat less expensive approach is to replace the original shock absorbers with those of the load leveler type, which include separate coil springs for augmenting the vehicle springs, but this technique usually raises the vehicle body and results in a hard ride under average driving conditions. Alternatively, air pressurized shock absorbers may be used, but the pressure of the air must be continuously accommodated to changing vehicle loading and roadway conditions to maintain satisfactory handling.

Perhaps the least expensive known approach to stiffen a vehicle's suspension system is to insert rigid or metal spacers between adjacent convolutions of the coil springs. Such spacers at all times engage and usually expand the adjacent convolutions, and absolutely prevent any movement together of the same during compression of the remainder of the spring. Although the technique is often favored because of its economy of implementation, the resulting ridability of the vehicle under average driving conditions is harsh.

OBJECT OF THE INVENTION

The primary object of the present invention is to provide an improved and economical means for enhancing the suspension system of an automotive vehicle for improved handling, roadability and load carrying capability, without sacrificing passenger comfort.

SUMMARY OF THE INVENTION

In accordance with the present invention, in combination with a coil spring of an automotive vehicle suspension system, there are provided devices for insertion between adjacent spring convolutions. Each device comprises a resilient body mountable on one of and between an adjacent pair of convolutions, the body usually having a thickness which is less than the spacing between the convolutions for limited compressions of the spring, but greater than the spacing upon increased compressions. The body therefore does not resist movement together of the adjacent convolutions for limited compressions, but upon increased compressions it engages both convolutions and resists their further movement together to stiffen the spring. The compliance of the resilient body allows it to act as a transitional contact member, while at the same time provides noise isolation upon contact with the convolutions, and the device does not interfere with the standard manufacture height of the springs and vehicle. Occupants of the vehicle are therefore afforded a smooth, quiet and comfortable ride under normal driving conditions, and yet the suspension system is stiffened under severe driving conditions for improved handling and safety.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is an elevation view, partly in cross section, illustrating one embodiment of spacer device mounted between adjacent convolutions of a coil spring of an automotive vehicle suspension system;

FIG. 2 is similar to FIG. 1, and illustrates a second embodiment of spacer device;

FIG. 3 is a top plan view, illustrating one possible angular orientation of the devices of FIG. 1 or 2 around a spring convolution;

FIG. 4 is a top plan view, showing another angular orientation of devices around a spring convolution;

FIG. 5 is a top plan view of a helical embodiment of device mounted between adjacent spring convolutions, and FIGS. 6-24 illustrate various additional embodiments of resilient material devices.

DETAILED DESCRIPTION

The invention provides resilient spacer devices or inserts which are mountable between adjacent convolutions of coil springs of an automotive vehicle suspension system. The devices progressively stiffen the suspension system upon increasing compressions of the springs, but do not interfere with the normal design characteristics of the suspension system under conditions of limited compressions. Consequently, occupants of the vehicle are afforded a smooth and comfortable ride under normal driving conditions, as are ususally encountered most of the time, yet progressive spring stiffening occurs under markedly undulating or severe conditions for improved roadability, handling and safety. The spacers are of economical construction, convenient to install and within the economic reach of an automobile owner.

Referring to FIG. 1, there is indicated generally at 10 a spacer device configured in accordance with one embodiment of the invention. The device comprises a body 12 of resilient material, such as rubber having a durometer of 40-110. The body is mountable between adjacent convolutions of a coil spring 14 of an automotive vehicle suspension, and includes a generally flat bottom 16, sides 18 and an upper end defining a pair of humped portions 20 to opposite sides of a concave area 22. Passages 24 through the body receive stove bolts 26 having heads 28 and lower threaded ends 30 projecting beyond the bottom of the spacer.

The device is preferably supported on an active convolution of the coil spring, for example one or two from the spring top or bottom. To mount the device, the body 12 is positioned between the convolutions with the bottom 16 resting on one and the concave area 22 at least partially receiving the other. The stove bolts extend on opposite sides of and to positions beneath the one convolution, and an apertured plate 32 receives the threaded bolt ends. Lock washers 34 and nuts 36 are then uniformly tightened on the bolts to clamp the body and plate together on opposite sides of the convolution until the bottom of the body begins to visually deform, as at 38.

The body 12 is of a height such that, with the vehicle at rest, a space preferably exists between the spring convolution and the lower portion of the concave area 22, and one or more devices are between each of one or more adjacent pairs of convolutions, for example two or three devices per pair. Where two are used, as shown in FIG. 4 they are advantageously 180° apart, with one toward and one away from the associated vehicle wheel. Where three are used, as shown in FIG. 3 they are advantageously 120° apart, with one toward the wheel. If a single device is used, it would be located toward the wheel for increased vehicle stability during cornering. It is understood, however, that the invention contemplates other orientations, and if desired more than three devices may be used per adjacent pair of convolutions.

The spacing "d" between the device and spring convolution prevents the device from interfering with limited compressions of the spring. The spacing preferably is selected so that under average and smooth driving conditions the device does not simultaneously engage both convolutions for limited amounts of spring compressions, whereby it does not interfere with the manufactured height of the spring or vehicle and the vehicle's suspension system operates in its designed manner to afford the occupants a smooth and comfortable ride. However, the spacing is also selected so that upon increased compressions of the spring, as occur on bumpy or undulating roads, when turning at increased speeds, during hard braking or acceleration, or when the vehicle is heavily laden, the device contacts both convolutions and compliantly resists their further movement together so that the stiffness of the suspension system is progressively increased for improved vehicle handling, driveability and safety.

When three devices are associated with an adjacent pair of convolutions as in FIG. 3, advantages are obtained when the spacings d progressively change from device to device by fractional amounts, wherein the denominator of the fraction equals the number of devices on a convolution and the numerator initially equals the denominator but is decreased by "1" for each successive device. For example, if the device 10a has the maximum spacing d, then the spacing of the device 10a would be 3/3d, that of the device 10b would be ⅔d and that of the device 10c would be ⅓d. When two devices are associated with each coil spring as in FIG. 4, the spacings may follow the same formula. In this case, the denominator of the fraction would be "2", and the spacing of the device 10e would be ½ that of the device 10d.

To accommodate the devices to a variety of automotive vehicles, they may be manufactured to a length between the bottom of the concave portion 22 and the bottom surface 16 which is greater than the spacings normally encountered between adjacent convolutions of conventional springs. Thus, prior to mounting the devices, a user simply selects the appropriate lengths for the devices to provide the desired spacings d and cuts off selected amounts from the bottoms of the devices. When mounted, because of the spacings d the devices do not interfere with limited compressions of the springs. However, upon occurrence of increased compressions, as a result of the progressive spacings the devices sequentially engage the adjacent spring convolution to smoothly increase the spring's resistance to compression. Obviously, where devices are mounted between two or more adjacent pairs of convolutions of a single spring, the spacings may be selected as above or so that progressive resistance to compression is offered from pair to pair of adjacent convolutions, from device to device around each pair of convolutions or in any other desired fashion.

The devices therefore permit the suspension system of a conventional automobile to operate in its intended design manner under average driving conditions, yet assume the characteristics of a heavy duty or "high performance" system under severe conditions. They enable the springs to variably resist the momentum of the mass of the vehicle body and frame upon encountering dips in the road, during hard braking, acceleration and cornering, or when the vehicle is heavily laden, and provide a transitional rate of spring compression resistance to automatically compensate for the sprung and unsprung forces exerted by the mass of the vehicle. Due to the large amount of energy that the springs are able to absorb when the devices are employed, complete collapse or bottoming of the springs is prevented during jounce, rebound is lessened to an extend that a standard vehicle's suspension system has capabilities approaching those of a true pneumatic system, and shock absorbers and other systems components are subject to less stress and wear for longer life.

The embodiment indicated at 100 in FIG. 2 is similar to that of FIG. 1, except that a hollow chamber 102 is formed within a body portion 104 and opened to atmosphere through a vent 106. The device offers a more variable resistance to spring compression because of the vented chamber, the size of vent being selected to control movement of air therethrough in a manner to yield a desired rate of compressibility.

FIG. 5 is a top plan view of a generally helical embodiment of resilient spacer device, indicated generally at 200, between adjacent spring convolutions. The device may be fastened to one of the convolutions in any suitable manner, for example by bolts 26, only the heads 28 of which are shown. The height of the spacer preferably is selected to maintain a spacing between it and the other convolution, and the device is tapered in height along its length so that the spacing progressively descreases from one end to the other. An advantage of a helix over discrete devices resides in its ability to provide an extremely uniform progression of increasing spring stiffness over an extended portion of a convolution as the spring is compressed. Although the helical spacer is shown extending over about 240° of the convolution, it could extend a greater or lesser amount, and more than one spacer may be used per spring.

FIG. 6 illustrates a further embodiment of device indicated generally at 300 and comprising a resilient body 302 having at upper and lower ends pairs of humps 304 defining concave areas 306. An advantage of the configuration is that the device does not require hardware for mounting. Instead, it is maintained on a spring by means of the conave areas receiving adjacent convolutions. To provide a "spacing" between the device and convolutions, a passage 308 extends through the body, and walls 310 on opposite sides of the passage flex outwardly upon longitudinal compression of the body, so that the insert has only very limited resistance to longitudinal compressions until a point is reached whereat normally separated protuberances 312 move together, whereupon the device then compliantly resists further spring compressions. The spacing between the protuberances is equivalent to the spacing d of the devices in FIGS. 1 and 2, and similar orientations of one or more devices on a spring are contemplated.

FIGS. 7, 8 and 9 illustrate additional embodiments of resilient devices having the general concepts and features of the device 300. These are also easily mounted on a coil spring in a similar manner, and by virture of central passages do not interfere with limited amounts of spring compression. However, upon sufficient compression, opposing walls of the passages move together to compliantly resist further compression.

The spacer device 400 of FIG. 10 has an arcuate extent of about 360°. When mounted on a spring convolution it assumes a helical configuration, but instead of having a progressively ramped surface like the spacer 200, it has three pedestals 402, 404 and 406. Each pedestal has a generally flat upper surface and outwardly sloping end walls, such as walls 404a of the pedestal 404, which extends downwardly to the surface of a lower body portion 408, and radially extending channels 410 are formed in the upper surface of the lower body between the pedestals and at the ends of the device.

As shown in FIG. 11, the body 408 has a concave lower surface 412 which facilitates its mounting on a spring convolution with the pedestals extending toward but spaced from an adjacent convolution. As also shown in FIG. 12, to retain the device on the convolution a plurality of twist-ties 414 of a known type, for example nylon straps having a buckle at one end for receiving and fastening to an opposite strap end, are wound and pulled tight around the body and convolution, with the straps extending through the channels for protection against abrasion. The spacings between the upper pedestal surfaces and the adjacent convolution provide the same advantages and benefits as were discussed in connection with the embodiment of FIG. 3, it being appreciated that the pedestals can be manufactured to have different heights which provide spacings "d" as discussed in connection with that embodiment. On the other hand, for some applications it may be desirable for the pedestals to have ramp type surfaces, so that upon sufficient compressions of the spring the pedestals are successively engaged, with engagement intitially occurring at one end of a pedestal surface and progressing to the opposite end prior to the next succeeding pedestal being contacted.

When one device is not sufficient to impart a desired degree of stiffness to a spring, as shown in FIG. 16 a pair of devices may be mounted on a single spring, for example on the last or next to last active convolution at each end of the spring to stiffen the reaction of the spring to compression beyond what would be obtainable with only a single device.

The device 500 in FIG. 13 is similar to the one in FIG. 10, except that it has four pedestals instead of three for greater control over the compression characteristics of the spring.

Each device 600 in FIG. 14 comprises an arcuate resilient body 602 having a concave lower surface 604 and three pedestals 606, 608 and 610 on its upper surface separated by a pair of channels 612. The devices are placed on a spring convolution, usually 120° apart with the convolution received in the concave area, and are then secured in place by twist-ties extending through the channels 612.

A quasa-ramp shaped resilient spacer device 700, shown in side elevation in FIG. 15, includes a body 702 having a concave lower surface 704, a triangular protuberance 706 on its upper surface and channels 708 to opposite sides of the protuberance. The device, and preferably a plurality of them angularly spaced, are mounterd on a coil spring convolution by means of twist-ties extending through the channels. The height of the protuberance is selected to normally provide a space between its uppers end or apex and the adjacent convolution, so that it does not interface with limited compressions of the spring. However, upon sufficient compressions the convolution engages the apex of the protuberance, whereupon the spring is progressively stiffened against further compression, partially because of the resilient nature of the material and partially because of the triangular shape of the protuberance. More particularly, in view of the triangular shaped protuberance, with further compression the convolution deforms and progressively contacts an increasing surface area of the protuberance, so that the stiffness of the spring is very uniformly and progressively increased. The configuration of device allows considerable control over the rate of change of stiffness imparted to the spring by means of selecting an appropriate steepness for the sloping surface of the protuberance.

FIGS. 17-20 illustrate a resilient spacer device having an arcuate extent of about 360° and a concave recess 802 in and along its lower surface to facilitate its mounting on a coil spring. When mounted on the spring by means of twist-ties 804 received within channels 806 in an upper surface 808 of the device, it assumes a helical configuration.

Similar to the spacer device 200, and as best seen in FIGS. 19 and 20, the upper surface 808 of the device 800 is progressively tapered from one end to the other, whereby the device uniformly and progressively decreases in height from end to end. However, and unlike the spacer device 200, the entire length of the upper surface device 200, the entire length of the uper surface 808 is also tapered or banked in the lateral or radial direction, such that along its outer side the device is of a greater height than along its inner side. The invention also contemplates a modification of the embodiment in which the surface 808, in addition to being laterally tapered, as shown in FIG. 19a is also slightly concave along its length.

Particular advantages are afforded by providing the surface 808 with both an arcuate and lateral taper. In that connection, it is to be understood that during compression and expansion, a coil spring of a vehicle suspension system does not travel in a true axial line. Instead, depending on the stresses to which it is subjected, during compression the spring has a tendency to bow. However, because the surface 808 is laterally tapered or banked, upon compression and engagement of the spring with the surface, the device exerts lateral forces on the spring which tend to hold it to an axial path of travel, whereby adequate compliance is available so as not to stress the spring, but to instead relieve side loading effects on remaining components of the suspension system. In addition, and in combination with the arcuate taper of the device, upon sufficient compression of the spring a graduated contact occurs between and along the surface 808 and the adjacent convolution in both lateral and arcuate directions, so that the device not only controls bowing of the spring but also progressively increases the resistance of the spring to further compression to impede roll of the vehicle when cornering and the like, without noticeably increasing the overall ride stiffness of the vehicle.

The spacer device 900 shown in FIGS. 21-24 also has an arcuate extent of about 360°. A lower surface of the device has a concave recess 902 along its length to facilitate mounting the device on a convolution of a coil spring by means of twist-ties received in radially extending channels 904, and when so mounted the device assumes a helical configuration. Similar to the preceding embodiment, the device 900 has an upper surface 906 which is tapered or ramped along its arcuate length from end to end, such that the device exhibits a progressively decreasing height from the one end to the other. Unlike the preceding device, however, the upper surface 906 is not laterally or radially tapered along the entirety of its length, but instead is provided with a relieved area 908, of limited arcuate extent, which is laterally tapered in the radial direction, so that along the relieved area the outer side of the device has a height greater than that of the inner side.

When mounted on a spring of a vehicle suspension system, the device is oriented so that the relieved area 908 faces toward the side of the vehicle, or toward the king pin or backing plate area of the suspension system. This allows the outside high point of the relieved area, upon sufficient compression of the spring, to contact the spring prior to the inside portion of the relieved area, so that there is no undue stressing of the spring and the vehicle has better transient handling and lower sway angles without excessive stiffening of the spring. At the same time, because the device is arcuately tapered from end to end, upon compression of the spring the device very uniformly and progressively increases the stiffness or resistance of the spring to further compression.

While embodiments of the invention have been described in detail, various modifications and other embodiments thereof may be devised by one skilled in the art without departing from the spirit and scope of the invention, as defined in the appended claims.

What is claimed is:

1. In combination with a coil spring of a vehicle suspension system, a device comprising a resilient body mounted between two adjacent convolutions of said spring for engaging said convolutions upon compression of said spring to increase the resistance of said spring to further compression and thereby stiffen the vehicle suspension system, including means for mounting one side of said body on one of said convolutions so that an opposite side of said body is toward, but spaced from, the other convolution for limited amounts of spring compression, wherein said body is helical and said opposite side of said body defines a surface which is progressively tapered along the length of said body from one end of said body to the other, so that said body has a progressively decreasing thickness between said convolutions from said one end to said other, said surface also being progressively tapered in the lateral direction radially of a center axis of said helical body and along the entirety of said length of said body, so that said body also has a progressively decreasing thickness between said convolutions from its radially outermost to its radially innermost side, whereby upon compression of said spring said device progressively increases the resistance of said spring to further compression and exerts forces on said spring which resist lateral bowing of said spring and tend to constrain said spring for compression along an axial path.

2. In a combination as in claim 1, wherein said surface of said body is substantially flat in radial cross section along the entirety of the length of said body.

3. In a combination as in claim 1, wherein said surface of said body is concave in radial cross section along the entirety of the length of said body.

4. In a combination as in claim 1, wherein the maximum thickness of said body is less than the spacing between said convolutions for said limited amounts of spring compression but greater than the spacing therebetween for increased and sufficient amounts of spring compression, whereby said body does not impede movement together of said convolutions upon limited compressions of said spring but engages said other convolution upon sufficient compressions to stiffen the resistance of said spring to further compression.

5. In a combination as in claim 1, wherein said means for mounting comprises twist-tie straps wrapped tightly around said body and said one convolution to secure said body on said convolution.

6. In a combination as in claim 5, including radially extending channels in said surface of said body, said twist-tie straps being received in said channels and said channels protecting said twist-tie straps from contact with said other convolution.

7. In a combination as in claim 1, wherein said body has a concave recess along its length in said one side thereof to facilitate mounting said body on said one convolution.

8. In a combination as in claim 1, wherein said body has an arcuate extent of about 360°.

9. In combination with a coil spring of a vehicle suspension system, a device comprising a resilient body mounted between two adjacent convolutions of said spring for engaging said convolutions upon compression of said spring to increase the resistance of said spring to further compression and thereby stiffen the vehicle suspension system, including means for mounting one side of said body on one of said convolutions so that an opposite side of said body is toward, but spaced from the other convolution for limited amounts of spring compression, wherein said body is helical and said opposite side of said body defines a surface which is progressively tapered along the length of said body from one end of said body to the other, so that said body has a progressively decreasing thickness between said convolutions from said one end to said other, said surface also being progressively tapered in the lateral direction radially of a center axis of said helical body and along only a portion of the length of said body intermediate said ends of said body to define a relieved area on said surface, said body along said relieved area having a progressively decreasing thickness between said convolutions from its radially outermost to its radially innermost side, whereby upon compression of said spring said device progressively increases the resistance of said spring to further compression and exerts forces on said spring which resist lateral bowing of said spring and tend to constrain said spring for compression along an axial path.

10. In a combination as in claim 9, wherein said surface of said body at said relieved area is substantially flat in radial cross section.

11. In a combination as in claim 9, wherein said surface of said body, other than at said relieved area, is generally flat and extends in a plane substantially perpendicular to a center axis of said helical body.

12. In a combination as in claim 9, wherein the maximum thickness of said body is less than the spacing between said convolutions for said limited amounts of spring compression but greater than the spacing therebetween for increased and sufficient amounts of spring compression, whereby said body does not impede movement together of said convolutions upon limited compressions of said spring but engages said other convolution upon sufficient compressions to stiffen the resistance of said spring to further compression.

13. In a combination as in claim 9, wherein said means for mounting comprises twist-tie straps wrapped tightly around said body and said one convolution to secure said body on said one convolution.

14. In a combination as in claim 13, including radially extending channels in siad flat portion of said surface of said body, said twist-tie straps being received in said channels and said channels protecting said twist-tie straps from contact with said other convolution.

15. In a combination as in claim 9, wherein said body has a concave recess along its length in said one side thereof to facilitate mounting said body on said one convolution.

16. In a combination as in claim 9, wherein said body has an arcuate extent of about 360°.

* * * * *